(12) United States Patent
Sauer et al.

(10) Patent No.: US 9,698,596 B2
(45) Date of Patent: Jul. 4, 2017

(54) POWER CONVERTER MODULE, PHOTOVOLTAIC SYSTEM HAVING A POWER CONVERTER MODULE, AND METHOD FOR OPERATING A PHOTOVOLTAIC SYSTEM

(71) Applicant: Robert Bosch GmbH, Stuttgart (DE)

(72) Inventors: Thomas Sauer, Karlsruhe (DE); Werner Belschner, Michelbach an der Bilz (DE); Rene Pohlemann, Eckstedt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 697 days.

(21) Appl. No.: 13/937,755

(22) Filed: Jul. 9, 2013

(65) Prior Publication Data
US 2014/0015318 A1    Jan. 16, 2014

(30) Foreign Application Priority Data
Jul. 13, 2012    (DE) .................. 10 2012 212 287

(51) Int. Cl.
*H02J 1/00*        (2006.01)
*H02J 3/32*        (2006.01)
*H02J 3/38*        (2006.01)

(52) U.S. Cl.
CPC    *H02J 1/00* (2013.01); *H02J 3/32* (2013.01); *H02J 3/385* (2013.01); *Y02E 10/566* (2013.01); *Y02E 10/58* (2013.01); *Y02E 70/30* (2013.01); *Y10T 307/352* (2015.04); *Y10T 307/406* (2015.04)

(58) Field of Classification Search
USPC .................. 320/101; 307/43, 82, 95
See application file for complete search history.

(56) References Cited

U.S. PATENT DOCUMENTS

| | | | |
|---|---|---|---|
| 2004/0125618 A1 | 7/2004 | De Rooji et al. | |
| 2010/0156185 A1* | 6/2010 | Kim | H01M 16/003 307/72 |
| 2011/0148360 A1* | 6/2011 | Lee | H02J 7/35 320/134 |

(Continued)

FOREIGN PATENT DOCUMENTS

DE    21 2008 000 035        4/2010

*Primary Examiner* — Rexford Barnie
*Assistant Examiner* — Xuan Ly
(74) *Attorney, Agent, or Firm* — Gerard Messina

(57) ABSTRACT

A power converter module includes: a DC input terminal configured to receive an input voltage from a DC source; an intermediate circuit coupled directly to the DC input terminal; a DC output terminal configured to provide an output direct voltage; an AC output terminal configured to provide an output alternating voltage; a DC converter coupled between the intermediate circuit and the DC output terminal in order to receive an input voltage from the intermediate circuit; an inverter coupled between the intermediate circuit and the AC output terminal in order to draw an input voltage from the intermediate circuit; and a regulating device coupled to the DC converter and to the inverter, the regulating device being configured to regulate the input voltage of the inverter and of the DC converter to a maximum power drain from the DC source.

11 Claims, 3 Drawing Sheets

(56) References Cited

U.S. PATENT DOCUMENTS

2011/0273130 A1* 11/2011 Lee .................... H01M 10/465
320/101
2013/0021006 A1* 1/2013 Fornage .................. H02M 7/48
323/234

* cited by examiner

POWER CONVERTER MODULE, PHOTOVOLTAIC SYSTEM HAVING A POWER CONVERTER MODULE, AND METHOD FOR OPERATING A PHOTOVOLTAIC SYSTEM

BACKGROUND OF THE INVENTION

1. Field of the Invention

The present invention relates to a power converter module, to a photovoltaic system having a power converter module, and to a method for operating a photovoltaic system.

2. Description of Related Art

Photovoltaic systems, or other systems having DC sources, such as fuel cells, galvanic cells, or DC generators, generally make use of power converters that convert the direct voltage provided by the DC source, for example a photovoltaic module having one or more solar cells, into the required DC layers and/or AC layers.

Standardly, a photovoltaic module, or a plurality of photovoltaic modules, is coupled to an intermediate circuit via an input DC converter, for example a flyback converter. From the intermediate circuit, power can then be fed into a battery storage device via a further DC converter. In addition, an inverter, galvanically separated if warranted, can be coupled to the intermediate circuit, and can take power from the intermediate circuit for feeding into an AC network.

In addition, it is known to operate the input DC converter at the operating point of maximum power drain from the photovoltaic module, by implementing a maximum power point regulation (maximum power point tracking, MPPT) in an MPP control unit. Here, the MPP control unit controls semiconductor components in the input DC converter in such a way that the power taken from the photovoltaic module is a maximum amount, because the optimal operating point of the photovoltaic module can fluctuate, for example due to varying solar radiation, or the occlusion of individual solar cells.

German utility model publication DE 21 2008 000 035 U1 discloses an inverter having a power-regulated DC converter at the input side, a DC converter at the output side, and an inverter at the output side. US Patent Application Publication No. 2004/0125618 A1 discloses a modular inverter system having a multiplicity of DC converters that feed an intermediate circuit, as well as an inverter fed from the intermediate circuit.

There is a need for solutions for power converters fed from DC sources, in which the topology of the power converter can be simplified, the efficiency increased, and the power loss minimized.

BRIEF SUMMARY OF THE INVENTION

According to an aspect of the present invention, the present invention creates a power converter module, in particular for the coupling of a DC source to an AC network on the one hand, and to an electrical energy storage system on the other hand, having a DC input terminal that is designed to receive an input voltage from a DC source, and having an intermediate circuit that is coupled directly to the DC input terminal, and having a DC output terminal that is designed to provide an output direct voltage, and having an AC output terminal that is designed to provide an output alternating voltage, and having a DC converter that is coupled between the intermediate circuit and the DC output terminal in order to draw an input voltage from the intermediate circuit, and having an inverter that is coupled between the intermediate circuit and the AC output terminal in order to draw an input voltage from the intermediate circuit, and having a regulating device that is coupled to the DC converter and to the inverter, and that is designed to regulate the input voltage of the inverter and of the DC converter to a maximum power drain from the DC source.

According to a further aspect, the present invention creates a photovoltaic system having one or more photovoltaic modules having at least one solar cell, and having a power converter module according to the present invention whose DC input terminal is coupled to an output terminal of the photovoltaic module, and having an electrical energy storage module that is coupled to the DC output terminal of the power converter module.

According to a further aspect, the present invention creates a method for operating a photovoltaic system, in particular a photovoltaic system having an electrical energy storage system, having the steps of direct feeding of a direct current from one or more photovoltaic modules into the intermediate circuit of a power converter module, of feeding the direct voltage of the intermediate circuit of the power converter module into an inverter of the power converter module coupled to the intermediate circuit of the power converter module and into a DC converter coupled to the intermediate circuit, and of regulating the input voltage of the inverter and of the DC converter to a maximum power drain from the photovoltaic module.

An idea of the present invention is to omit the input DC converter of the power converter, which couples the DC source to the intermediate circuit of the power converter, and to connect the DC source directly to the intermediate circuit of the power converter. Accordingly, a maximum power point tracking (MPPT) can be implemented for an inverter fed from the intermediate circuit and/or for a DC converter fed from the intermediate circuit, in order to optimize the power drain from the DC source.

An advantage of the present invention is that it can significantly simplify the power converter. The provision of an input DC converter is omitted, so that the cost for the manufacture of the power converter is reduced. In addition, the efficiency of the power converter is increased, because the power losses standardly incurred in an input DC converter do not occur.

It is particularly advantageous that the intermediate circuit can also be simplified by the simplified topology of the power converter, if the MPPT is provided with a corresponding regulating dynamics. In this way simpler and more advantageous film capacitors, having a longer useful life, can be used as intermediate circuit capacitors.

Moreover, it is advantageous that both a one-phase and also a multi-phase, e.g. three-phase, topology can be realized in the power converter; i.e., the power converter can act, as needed, both as a one-phase and as a multi-phase AC source.

According to a specific embodiment of the power converter module according to the present invention, the regulating device can have at least one maximum power point (MPP) regulator. This offers the advantage that the efficiency of a DC source connected to the power converter module, in particular of a photovoltaic module, can be optimized.

According to a further specific embodiment of the power converter module according to the present invention, the regulating device can have a first MPP regulator that is allocated to the inverter and that regulates the input voltage of the inverter. Alternatively or in addition, the regulating device can have a second MPP regulator that is allocated to the DC converter and that regulates the input voltage of the DC converter. Through this distributed regulation, a variable and flexible regulating strategy can be implemented that can enable a simplification of the components, in particular the components of the intermediate circuit of the power converter module.

According to a specific embodiment of the photovoltaic system according to the present invention, the photovoltaic system can include at least one AC consumer that is coupled to the AC output terminal of the power converter module. For example, the power converter module can also feed an AC network. This makes it possible advantageously to operate the photovoltaic system in network-parallel operating mode.

According to a further specific embodiment of the photovoltaic system according to the present invention, the photovoltaic module can be designed to feed a three-phase current into the power converter module. Alternatively or in addition, the power converter module can be designed to provide a three-phase current at the AC output terminal of the power converter module.

According to a specific embodiment of the method according to the present invention, the regulation of the inverter and of the DC converter of the power converter module can include a maximum power point tracking (MPPT). This offers the advantage that the efficiency of a DC source connected to the power converter module, in particular of a photovoltaic module, can be optimized.

According to a further specific embodiment of the method according to the present invention, the MPPT can include a regulation of the input voltage of the inverter and a determination of the power consumption of the DC converter as a function of the regulated input voltage of the inverter. Through this modular regulation design, the power consumption both of the inverter and of the DC converter can be matched to one another flexibly and so as to meet the needs of the particular situation.

According to a further specific embodiment of the method according to the present invention, the regulating dynamic of the MPPT of the DC converter can be greater than the regulating dynamic of the MPPT of the inverter. In this way, advantageously a two-stage regulation can be implemented, having a fast superposed regulator and a slow base regulation. This offers the advantage that the electrical energy storage device of the energy storage module can be used as a charging buffer in order to relieve the load on the intermediate circuit. In this way, the demands on the intermediate circuit capacitor can be reduced, so that for example film capacitors, having a longer useful life, can be used in the intermediate circuit.

Further features and advantages of specific embodiments of the present invention result from the following description, with reference to the accompanying drawings.

DETAILED DESCRIPTION OF THE INVENTION

Figure 1:
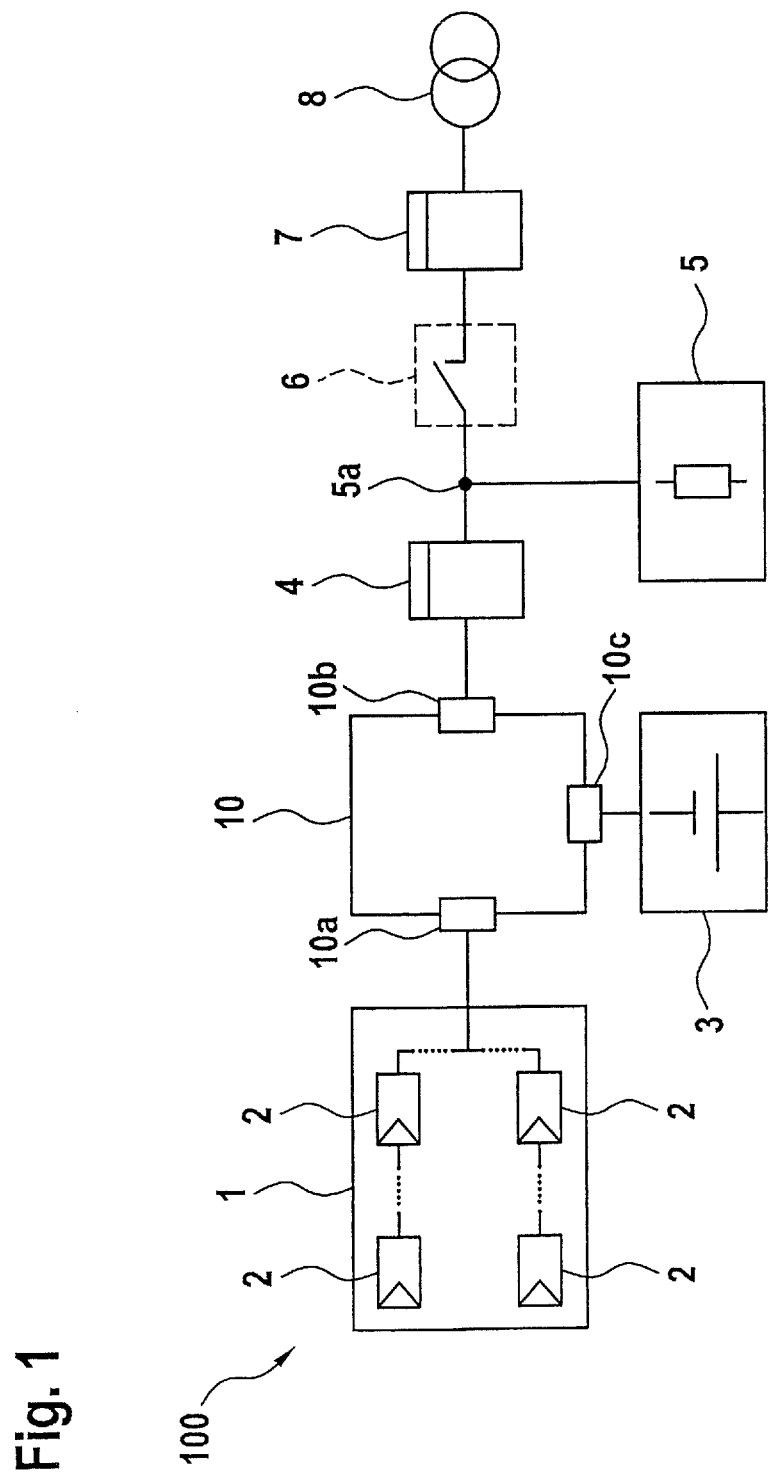
FIG. 1 shows a schematic representation of a system having a DC source, an AC network, AC consumers, and an electrical energy storage device according to a specific embodiment of the present invention.

FIG. 1 shows a schematic representation of a system 100, for example a photovoltaic system, in network-parallel operating mode. System 100 has a DC source 1, e.g. a photovoltaic module having one or more solar cells 2. The number of photovoltaic modules and of solar cells 2 is in principle unlimited. In addition, the photovoltaic modules and/or solar cells can be connected in parallel and/or in series. DC source 1 can alternatively also have a fuel cell, a galvanic cell, or a DC generator.

DC source 1 feeds a power converter module 10 via a DC input terminal 10*a*. Power converter module 10 has, in addition to DC input terminal 10*a*, a DC output terminal 10*c* that is designed to provide an output direct current, and has an AC output terminal 10*b* that is designed to provide an output alternating current. DC output terminal 10*c* is coupled to an electrical energy storage module 3, for example an accumulator or some other energy storage system.

AC output terminal 10*b* of power converter 10 is coupled to an output node 5*a* to which, at one side, one or more AC consumers 5 can be connected. At the other side, an AC network 8 can be connected to output node 5*a* via a contactor disconnector 6. In this way, system 100 can be operated in network-parallel operating mode; i.e., energy storage module 3 as well as AC consumer 5 can be fed with power from DC source 1 as needed. The remaining power can be fed into AC network 8 via contactor disconnector 6. For this purpose, current counters can be used at corresponding locations, for example an output counter 4 that determines the overall output of DC source 1, and/or a feed-in counter 7 that detects the energy fed into AC network 8. System 100 can for example be implemented in a residential building having household consumers 5 and photovoltaic module 1 installed on a roof of the building.

Figure 2:
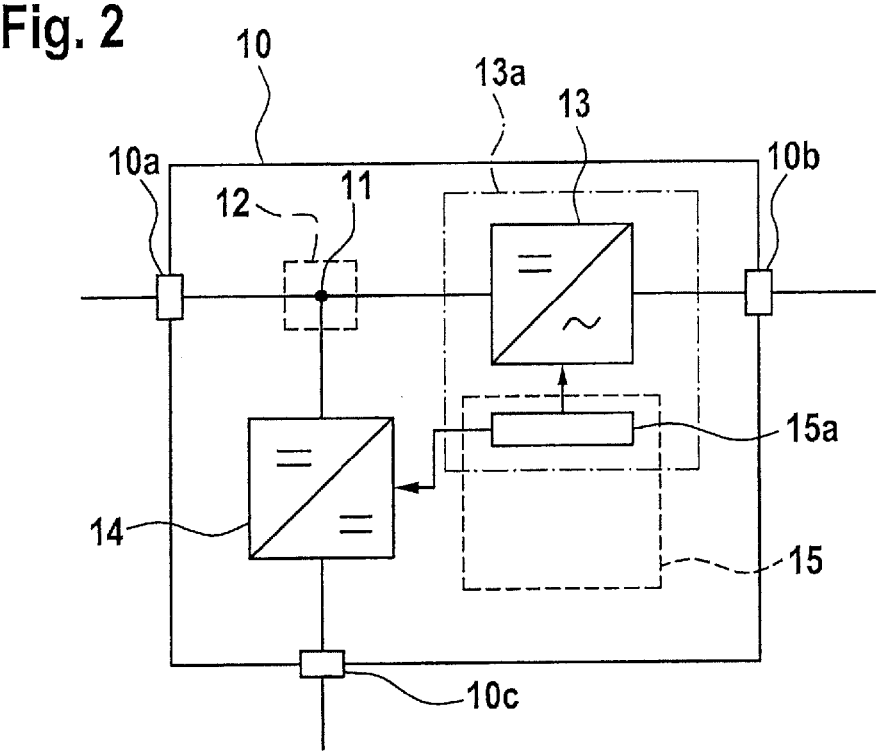
FIG. 2 shows a schematic representation of a power converter module according to a further specific embodiment of the present invention.

FIG. 2 shows a schematic representation of a power converter module, in particular a power converter module 10, that can be used in system 100 shown in FIG. 1. Power converter module 10 has a DC input terminal 10*a* that is designed to receive an input voltage of a DC source 1, for example of a photovoltaic module 1. Power converter module 10 has an intermediate circuit 12 having an intermediate circuit node 11 that is coupled directly to DC input terminal 10*a*; that is, intermediate circuit 12 is fed by DC source 1 without the intermediate connection of an active voltage-converting element. If necessary, another protective circuit for DC source 1, a contactor disconnector or a filter for improving the electromagnetic compatibility, can be coupled between intermediate circuit 12 and DC input terminal 10*a*. Intermediate circuit 12 can for example include an intermediate circuit capacitor.

Power inverter module 10 further has a DC output terminal 10*c* that is designed to provide an output direct current, as well as an AC output terminal 10*b* designed to provide an output alternating current. Between intermediate circuit 12 and DC output terminal 10*c* there is coupled a DC converter 14 for drawing an input voltage from intermediate circuit 12. Between intermediate circuit 12 and AC output terminal 10b there is coupled an inverter 13 for drawing an input voltage from intermediate circuit 12. DC converter 14 can for example be a galvanically separated DC converter, such as a push-pull converter or a flyback converter. Alternatively, DC converter 14 can also be made without galvanic separation, for example as a synchronous converter or a step-up/step-down converter, or buck-boost converter. Inverter 13 can also be made with or without galvanic separation. For example, inverter 13 can be a self-guided or externally guided one-phase or multi-phase inverter.

Power converter module 10 also has a regulating device 15 that is coupled to DC converter 14 and to inverter 13. Regulating device 15 is designed to regulate the input voltage of inverter 13 and of DC converter 14 for maximum power drain from DC source 1. In particular, regulating device 15 can carry out a maximum power point tracking (MPPT). For this purpose, regulating device 15 regulates the input voltage of inverter 13 and/or of DC converter 14 to the required value. For this purpose, regulating device 15 varies the voltage by a small amount. Here, if the product of current and voltage, i.e. the power of DC source 1, becomes larger, the new voltage is maintained; otherwise the voltage is reset to the original value. This iterative method is carried out constantly by regulating device 15. In particular in the case of photovoltaic modules having output that fluctuates over time due to changing radiation conditions, operation at maximum performance can in this way always be ensured.

In the specific embodiment shown as an example in FIG. 2, regulating device 15 has a first MPP regulator 15a that is allocated to inverter 13 and that regulates the input voltage of inverter 13. First MPP regulator 15a thus carries out an MPPT for inverter 13. As a function of the regulated input voltage of inverter 13, first MPP regulator 15a can control DC converter 14 to set the input voltage in order to match the power drawn by inverter 13 and by DC converter 14 from DC source 1 to one another. First MPP regulator 15a can for example be implemented in a microprocessor of a first power component 13a including inverter 13.

Figure 3:
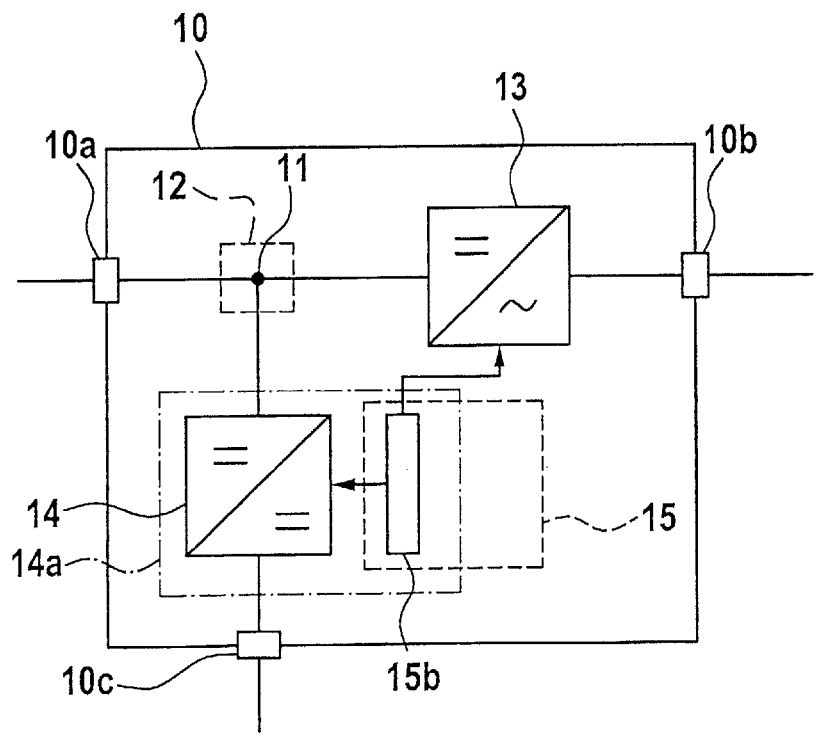
FIG. 3 shows a schematic representation of a further power converter module according to a further specific embodiment of the present invention.

FIG. 3 shows a schematic representation of a further power converter module, in particular a further power converter module 10 that can be used in system 100 shown in FIG. 1. The essential difference between power converter module 10 shown in FIG. 3 and the power converter module shown in FIG. 2 is that regulating device 15 has, instead of first MPP regulator 15a, a second MPP regulator 15b that is allocated to DC converter 14 and that regulates the input voltage of DC converter 14. Here, similar to first MPP regulator 15a, second MPP regulator 15b implements an MPPT for DC converter 14, and can for example be implemented in a microprocessor of a second power component 14a that includes DC converter 14. Second MPP regulator 15a can, as a function of the regulated input voltage of DC converter 14, control inverter 13 in order to set the input voltage, in order to match the power drawn by inverter 13 and by DC converter 14 from DC source 1 to one another.

Figure 4:
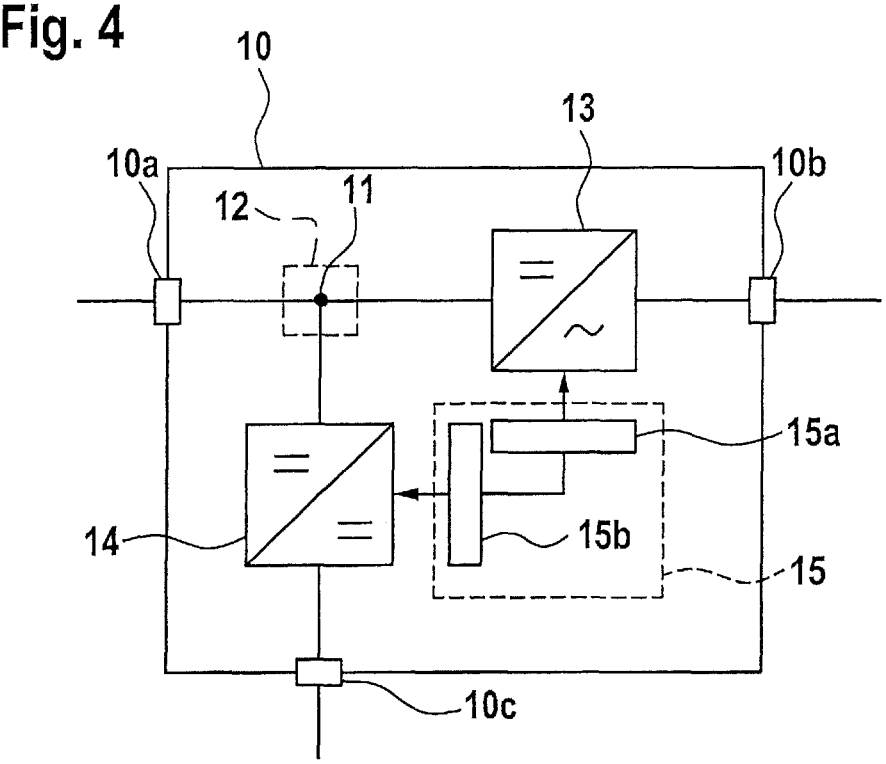
FIG. 4 shows a schematic representation of a further power converter module according to a further specific embodiment of the present invention.

FIG. 4 shows a schematic representation of a further power converter module, in particular a further power converter module 10, that can be used in system 100 shown in FIG. 1. In power converter module 10 shown in FIG. 4, regulating device 15 includes both first MPP regulator 15a and also second MPP regulator 15b, as a distributed regulating system. For example, first MPP regulator 15a can implement a fast, subordinate MPPT, while second MPP regulator 15b implements a slow, superposed MPPT. Depending on the regulating dynamics of MPP regulators 15a and 15b, the MPP regulation can be implemented so quickly that the capacitor of electric energy storage module 3 can be used as a buffer capacitor. In this way, the voltage demands made on intermediate circuit 12 can be reduced, enabling a simple and advantageous implementation of an intermediate circuit capacitor, for example via a film capacitor having a longer useful life.

Figure 5:
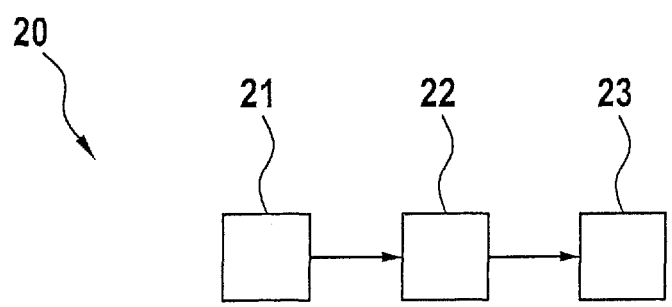
FIG. 5 shows a schematic representation of a method for operating a photovoltaic system according to a further specific embodiment of the present invention.

FIG. 5 shows a schematic representation of an example of a method 20 for operating a photovoltaic system, in particular in network-parallel operating mode. Method 20 can for example be implemented in system 100 shown in FIG. 1 with the assistance of power converter modules 10 shown as examples in FIGS. 2 through 4.

In a first step 21, there takes place a direct feeding of a direct current from a photovoltaic module 1 into intermediate circuit 12 of a power converter module 10; i.e., a feeding in without voltage conversion. In a second step 22, there takes place a feeding in of the direct current of intermediate circuit 12 into an inverter 13, coupled to intermediate circuit 12, of power converter module 10, and into DC converter 14, coupled to intermediate circuit 12. In a third step 23, there takes place a regulation of the input voltage of inverter 13 and of DC converter 14 to a maximum power drain from photovoltaic module 1, in particular via a maximum power point tracking (MPPT), as is explained in connection with FIG. 2.

The MPPT can for example take place through a regulation of the input voltage of inverter 13 and determining the power consumption of DC converter 14 as a function of the regulated input voltage of inverter 13. Alternatively, a regulation of the input voltage of DC converter 14 and a determination of the power consumption of inverter 13 can also take place as a function of the regulated input voltage of DC converter 14. Optionally, a distributed regulation can also take place, i.e. a correlated regulation both of the input voltage of DC converter 14 and of the input voltage of inverter 13, so that the power drain from photovoltaic module 1 is optimized.

The regulating dynamics of the MPPT of DC converter 14 can for example be greater than the regulating dynamics of the MPPT of inverter 13, for example if a faster, superposed MPP regulator is used to regulate the input voltage of DC converter 14 and a slower, subordinate MPP regulator is used to regulate the input voltage of inverter 13.

What is claimed is:

1. A power converter module, comprising:
  a DC input terminal configured to receive an input voltage from a DC source;
  an intermediate circuit coupled directly to the DC input terminal;
  a DC output terminal configured to provide an output direct voltage;
  an AC output terminal configured to provide an output alternating voltage;
  a DC converter coupled between the intermediate circuit and the DC output terminal in order to draw an input voltage from the intermediate circuit;
  an inverter coupled between the intermediate circuit and the AC output terminal in order to draw an input voltage from the intermediate circuit; and
  a regulating device coupled to the DC converter and to the inverter, wherein the regulating device is configured to regulate the input voltage of the inverter and the input voltage of the DC converter to a maximum power drain from the DC source, wherein:
    the regulating device has a first maximum power point regulator allocated to the inverter and regulating the input voltage of the inverter, and the regulating device has a second maximum power point regulator allocated to the DC converter and regulating the input voltage of the DC converter.

2. A photovoltaic system, comprising:
 at least one photovoltaic module having at least one solar cell;
 a power converter module including:
  a DC input terminal configured to receive an input voltage from a DC source;
  an intermediate circuit coupled directly to the DC input terminal;
  a DC output terminal configured to provide an output direct voltage;
  an AC output terminal configured to provide an output alternating voltage;
  a DC converter coupled between the intermediate circuit and the DC output terminal in order to draw an input voltage from the intermediate circuit;
  an inverter coupled between the intermediate circuit and the AC output terminal in order to draw an input voltage from the intermediate circuit; and
  a regulating device coupled to the DC converter and to the inverter and including a first maximum power point regulator allocated to the inverter and a second maximum power point regulator allocated to the DC converter, wherein the regulating device is configured to regulate the input voltage of the inverter and the input voltage of the DC converter to a maximum power drain from the DC source;
  wherein the DC input terminal is coupled to an output terminal of the at least one photovoltaic module; and
 an electric energy storage module coupled to the DC output terminal of the power converter module.

3. The photovoltaic system as recited in claim 2, further comprising:
 at least one AC consumer coupled to the AC output terminal of the power converter module.

4. The photovoltaic system as recited in claim 2, wherein the at least one photovoltaic module is configured to feed a three-phase current into the power converter module.

5. The photovoltaic system as recited in claim 2, wherein the power converter module is configured to provide a three-phase current to the AC output terminal of the power converter module.

6. A method for operating a photovoltaic system, comprising:
 directly feeding a direct current from at least one photovoltaic module into an intermediate circuit of a power converter module;
 feeding the direct voltage of the intermediate circuit of the power converter module (i) into an inverter of the power converter module, the inverter being coupled to the intermediate circuit of the power converter module, and (ii) into a DC converter of the power converter module, the DC converter being coupled to the intermediate circuit of the power converter module; and
 regulating the input voltage of the inverter and the input voltage of the DC converter to a maximum power drain from the at least one photovoltaic module.

7. The method as recited in claim 6, wherein the regulation of the input voltage of the inverter and the input voltage of the DC converter includes a maximum power point tracking.

8. The method as recited in claim 7, wherein the maximum power point tracking includes a regulation of the input voltage of the inverter and a determination of the power drain of the DC converter as a function of the regulated input voltage of the inverter.

9. The method as recited in claim 7, wherein a regulation dynamic of the maximum power point tracking of the DC converter is greater than a regulation dynamic of the maximum power point tracking of the inverter.

10. The power converter module of claim 1, wherein a regulation dynamic of the second maximum power point regulator is faster than a regulation dynamic of the first maximum power point regulator.

11. The photovoltaic system of claim 2, wherein a regulation dynamic of the second maximum power point regulator is faster than a regulation dynamic of the first maximum power point regulator.

* * * * *